United States Patent
Dong et al.

(10) Patent No.: US 7,421,415 B2
(45) Date of Patent: Sep. 2, 2008

(54) METHODS AND SYSTEMS FOR 3D OBJECT DETECTION USING LEARNING

(75) Inventors: Anlei Dong, Riverside, CA (US); Xiang Sean Zhou, Exton, PA (US); Dorin Comaniciu, Princeton Jct., NJ (US); Christian P. Schultz, Beverly, MA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 463 days.

(21) Appl. No.: 11/215,249

(22) Filed: Aug. 30, 2005

(65) Prior Publication Data

US 2006/0074834 A1    Apr. 6, 2006

Related U.S. Application Data (60) Provisional application No. 60/607,601, filed on Sep. 7, 2004, provisional application No. 60/616,357, filed on Oct. 6, 2004.

(51) Int. Cl.
   *G06F 15/18* (2006.01)
(52) U.S. Cl. .......................... 706/12; 706/20
(58) Field of Classification Search ........................ None
   See application file for complete search history.

(56) References Cited

U.S. PATENT DOCUMENTS

| | | | |
|---|---|---|---|
| 6,421,654 B1 * | 7/2002 | Gordon ........................ 706/16 |
| 6,434,261 B1 * | 8/2002 | Zhang et al. ................. 382/132 |
| 6,556,699 B2 * | 4/2003 | Rogers et al. ............... 382/132 |
| 6,650,766 B1 * | 11/2003 | Rogers et al. ............... 382/132 |
| 6,757,415 B1 * | 6/2004 | Rogers et al. ............... 382/130 |
| 6,760,468 B1 * | 7/2004 | Yeh et al. .................... 382/132 |
| 6,763,128 B1 * | 7/2004 | Rogers et al. ............... 382/130 |
| 6,801,645 B1 * | 10/2004 | Collins et al. ............... 382/130 |
| 6,901,156 B2 * | 5/2005 | Giger et al. .................. 382/128 |
| 6,970,587 B1 * | 11/2005 | Rogers ........................ 382/132 |
| 6,996,549 B2 * | 2/2006 | Zhang et al. .................. 706/16 |
| 7,016,884 B2 * | 3/2006 | Platt et al. ...................... 706/20 |
| 7,087,018 B2 * | 8/2006 | Comaniciu et al. .......... 600/300 |
| 7,123,762 B2 * | 10/2006 | Giger et al. ................. 382/132 |
| 7,184,582 B2 * | 2/2007 | Giger et al. ................. 382/128 |
| 7,187,790 B2 * | 3/2007 | Sabol et al. ................. 382/128 |
| 7,187,800 B2 * | 3/2007 | Hibbard ...................... 382/173 |
| 7,244,230 B2 * | 7/2007 | Duggirala et al. ........... 600/300 |
| 7,298,883 B2 * | 11/2007 | Giger et al. ................. 382/132 |

(Continued)

OTHER PUBLICATIONS

Learning-based Method for P53 Immunohistochemically Stained Cell Image Segmentation Mao, K.Z.; Peng Zhao; Puay-Hoon Tan; Engineering in Medicine and Biology Society, 2005. IEEE-EMBS 2005. 27th Annual International Conference of the 2005 pp. 3264-3267 Digital Object Identifier 10.1109/IEMBS.2005.1617173.*

(Continued)

*Primary Examiner*—Michael B Holmes (57) ABSTRACT

In a method of 3D object detection, a learning procedure is used for feature selection from a feature set based on an annotated image-volume database, generating a set of selected features. A classifier is built using a classification scheme to distinguish between an object location and a non-object location and using the set of selected features. The classifier is applied at a candidate volume to determine whether the candidate volume contains an object of interest.

39 Claims, 9 Drawing Sheets

U.S. PATENT DOCUMENTS

| | | | | |
|---|---|---|---|---|
| 7,308,126 | B2* | 12/2007 | Rogers et al. | 382/132 |
| 7,310,547 | B2* | 12/2007 | Zelenchuk | 600/407 |
| 7,317,821 | B2* | 1/2008 | Chen et al. | 382/130 |
| 7,333,963 | B2* | 2/2008 | Widrow et al. | 706/18 |
| 7,383,237 | B2* | 6/2008 | Zhang et al. | 706/20 |
| 7,386,165 | B2* | 6/2008 | Dundar et al. | 382/155 |

OTHER PUBLICATIONS

A Machine Learning Approach for Locating Boundaries of Liver Tumors in CT Images Yuanzhong Li; S. Hara; K. Shimura; Pattern Recognition, 2006. ICPR 2006. 18th International Conference on vol. 1, 2006 pp. 400-403 Digital Object Identifier 10.1109/ICPR.2006.93.*

Strict 2-Surface Proximal Classifier with Application to Breast Cancer Detection in Mammograms Tingting Mu; Nangi, A.K.; Rangayyan, R.M.; Acoustics, Speech and Signal Processing, 2007. ICASSP 2007. IEEE International Conference on vol. 2, Apr. 15-20, 2007 pp. II-477-II-480 Digital Object Identifier 10.1109/ICASSP.2007.366276.*

An automated multispectral pixel and image classification system using texture analysis and neural networks Zheng, Y.; Foley, D.A.; Kinter, T.M.; Greenleaf, J.F.; Ultrasonics Symposium, 1992. Proceedings., IEEE 1992 Oct. 20-23, 1992 pp. 1093-1096 vol. 2 Digital Object Identifier 10.1109/ULTSYM.1992.276007.*

Efficient Multilevel Brain Tumor Segmentation With Integrated Bayesian Model Classification Corso, J.J.; Sharon, E.; Dube, S.; El-Saden, S.; Sinha, U.; Yuille, A.; Medical Imaging, IEEE Transactions on vol. 27, Issue 5, May 2008 pp. 629-640 Digital Object Identifier 10.1109/TMI.2007.91.*

A fuzzy based adaptive BPNN learning algorithm for segmentation of the brain MR images Shah, J.Z.; Husain, S.A.; Multitopic Conference, 2004. Proceedings of INMIC 2004. 8th International Dec. 24-26, 2004 pp. 85-90 Digital Object Identifier 10.1109/INMIC.2004.1492851.*

A study on several Machine-learning methods for classification of Malignant and benign clustered microcalcifications Liyang Wei; Yongyi Yang; Nishikawa, R.M.; Yulei Jiang; Medical Imaging, IEEE Transactions on vol. 24, Issue 3, Mar. 2005 pp. 371-380 Digital Object Identifier 10.1109/TMI.2004.842457.*

Segmenting brain tumors using alignment-based features Schmidt, M.; Levner, I.; Greiner, R.; Murtha, A.; Bistritz, A.; Machine Learning and Applications, 2005. Proceedings. Fourth International Conference on Dec. 15-17, 2005 Page(s):6 pp. Digital Object Identifier 10.1109/ICMLA.2005.56.*

Visualization of 3D medical images for radiotherapy planning Miyazawa, T.; Yoshida, R.; Kimura, M.; Otsuki, T.; Nuclear Science Symposium and Medical Imaging Conference, 1991., Conference Record of the 1991 IEEE Nov. 2-9, 1991 pp. 1553-1557 vol. 3 Digital Object Identifier 10.1109/NSSMIC.1991.259172.*

* cited by examiner

Type 1

Type 2

Type 3

Type 4

Type 5

Type 6

Type 7

Type 8

Type 9

Type 10

(a) corner feature    (b) U feature    (c) 3D corner feature

METHODS AND SYSTEMS FOR 3D OBJECT DETECTION USING LEARNING

CROSS-REFERENCE TO RELATED APPLICATION

This application claims the benefit of U.S. Provisional Application Ser. No. 60/607,601, filed Sep. 7, 2004 and entitled "Boosting-Based 3D Object Detection with Application to Tumor Detection in 3D Lung Images," the content of which is hereby incorporated by reference in its entirety. This application further claims the benefit of U.S. Provisional Application Ser. No. 60/616,357, filed Oct. 6, 2004 and entitled "Boosting Incorporating Feature Cost," the content of which is hereby incorporated by reference in its entirety.

BACKGROUND OF THE INVENTION

1. Field of the Invention

The present invention relates to methods and systems for 3D object detection. More particularly, the present invention relates to methods and systems for 3D object detection using learning.

2. Description of the Related Art

Figure 1:
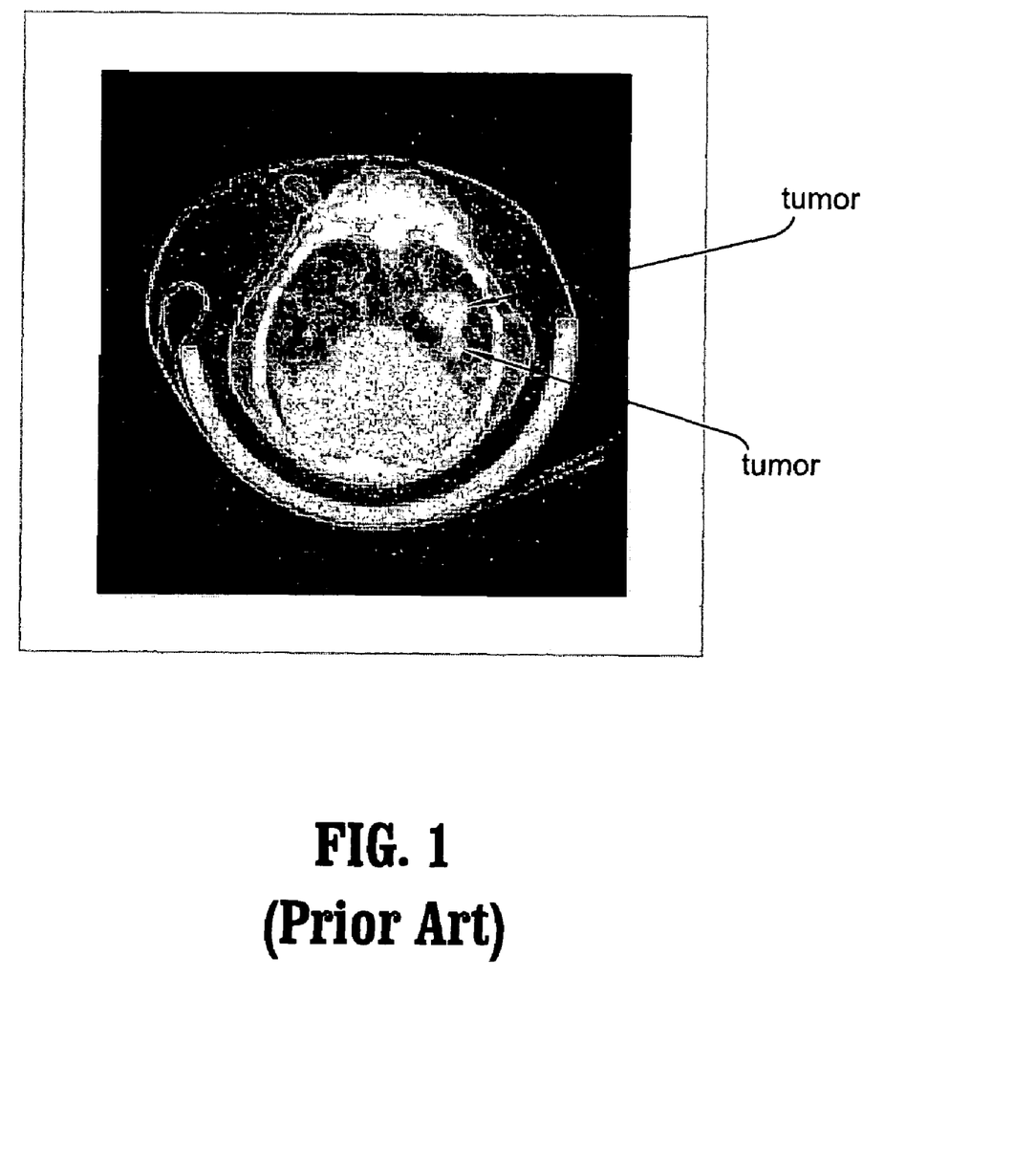
FIG. 1 shows examples of lung tumors in a 3D CT lung image.

Detection of objects is important in medical and non-medical applications. For example, medical image analysis and diagnosis depends on the ability to detect anatomical structures. FIG. 1 shows examples of lung tumors in a 3D CT lung image.

Object detection in 3D and 4D (4D=3D+Time) data is difficult given the large amount of data associated with each image, increased noise level and computational complexity. In object detection, the classes to be discriminated are not defined by the variations of the different objects themselves, but rather by distinguishing between "images containing the object" and "images not containing the object." Without restricting the domain of images for which the system must discriminate, the task of training an object detection system is time-consuming and difficult.

Machine learning, an area of artificial intelligence concerned with the development of techniques that allow computers to "learn" through the analysis of data sets, investigates the mechanisms by which knowledge is acquired through experience. The field of machine learning is concerned with both the analysis of data and the algorithmic complexity of computational implementations. Machine learning has a wide spectrum of applications including: stock market analysis, classifying DNA sequences, search engines, speech and handwriting recognition, medical diagnosis, and game playing. Common learning algorithm types include supervised learning or classification, unsupervised learning and reinforcement learning.

In machine learning theory, combining multiple classifiers is an effective technique for improving prediction accuracy. There are numerous general combining algorithms such as bagging, boosting, and error-correcting output codes. Boosting, which has its roots in PAC (probably approximately correct) learning, is a machine learning algorithm for performing supervised learning. Freund, Y. and Schapire, R. E. (1996), "Experiments with a new boosting algorithm," In *Machine Learning: Proceedings of the Thirteenth International Conference*, Bari, Italy, pp. 148-156.

The idea of boosting is to design a series of training sets and use a combination of classifiers trained on these sets. The training sets are chosen sequentially, with the weights for each training example being modified based on the success of the classifier trained on the previous set. That is, greater weight is assigned to those training examples that were difficult to classify, i.e., those for which the misclassification rate was high, and lower weights to those that were easy to classify. Note that boosting can also be applied to learning methods that do not explicitly support weights. In that case, random sub-sampling can be applied to the learning data in the successive steps of the iterative boosting procedure. Freund and Schapire's AdaBoost algorithm is generally considered as a first step towards more practical boosting algorithms. Freund, Y. and Schapire, R. E. (1997), "A decision-theoretic generalization of online learning and an application to boosting," In *Journal of Computer and System Sciences*, 55(1): 119-139.

As discussed in U.S. Pat. No. 6,546,379, boosting refers to a family of general methods that seek to improve the performance obtained from any given underlying method of building predictive models by applying the underlying methods more than once and then combining the resulting "weak" models into a single overall model that, although more complex than any of the "weak" models obtained from the underlying method, may make more accurate predictions. The term "weak", as used in connection with boosting, is a technical term used in the art; a "weak" model has imperfect performance that one hopes to improve by somehow combining the weak model with other weak models built by the same underlying method, but from different training examples of the available training sets. U.S. Pat. No. 6,546,379, entitled "Cascade boosting of predictive models," issued on Apr. 8, 2003 to Hong et al.

The task of classification is a key component in the fields of computer vision and machine learning. When an object is presented to a system for classification, the system selects specific features from the object and these features are passed to the classifier. The size of the search space grows exponentially with respect to the number of features; it is impossible to search exhaustively in the hypothesis space to find the optimal classifier.

Feature selection is an important part of many machine learning problems. Feature selection is used to improve the efficiency of learning algorithms by finding an optimal subset of features. FIG. 2 illustrates sample features for object detection with different computational costs. There has been a great deal of work on developing feature selection methods. Liu and Motoda provide an overview of the methods developed since the 1970s. Liu, H., and Motoda, H. (1998), *Feature Selection for Knowledge Discovery and Data Mining*, ISBN 0-7923-8198-X, Kluwer Academic Publishers.

The principal aim of designing a classifier is to accurately classify input. Classification accuracy depends on diverse factors, including sample size and the quality of training data. Duda, R., Hart, P. and Stork, D. (2001), *Pattern Classification*, 2nd ed., ISBN: 0471-05669-3, John Wiley & Sons. Research has shown two approaches, namely, the support vector machine approach and boosting, are effective for classification. Meir and Ratsch provide an overview of applications of boosting algorithms; the main ideas are illustrated on the problem of binary classification. Meir, R. and Ratsch, G (2003), "An introduction to boosting and leveraging," In *Advanced Lectures on Machine Learning*, pp. 119-184, Springer.

Classification accuracy is a critical design consideration, as discussed above. Many real-time computer vision tasks also require a fast processing response, and this requires fast classification processes. For example, methods to detect faces in videos require scanning through a large number of possible candidate regions. Another more challenging example is the task of tumor detection in 3D CT lung images, which requires large 3D sub-volume datasets for scanning. Classification accuracy and fast classification processes are critical in developing 3D object detection methods and systems for medical and non-medical applications.

SUMMARY OF THE INVENTION

According to an exemplary embodiment of the present invention, a method is provided for 3D object detection. The method includes using a learning procedure for feature selection from a feature set based on an annotated image-volume database, generating a set of selected features; building a classifier using a classification scheme to distinguish between an object location and a non-object location and using the set of selected features; and applying the classifier at a candidate volume to determine whether the candidate volume contains an object of interest.

According to an exemplary embodiment of the present invention, a boosting method incorporating feature cost to simultaneously optimize detection performance and cost is provided. The method includes the steps of: (a) inputting a set of training samples having a set of features and feature computational costs for the set of features; (b) generating a set of weak learners based on the set of features; and (c) building a boosting classifier based on a subset of the weak learners, to minimize a cost function of the detection performance and the feature computational costs.

According to an exemplary embodiment of the present invention, a boosting method incorporating feature cost to simultaneously optimize detection performance and cost is provided. The method includes the steps of: (a) inputting a set of training samples having a set of features, feature computational costs for the set of features, and a pre-determined number L that denotes the maximal number of strong classifiers; (b) generating a set of weak learners based on the set of features; (c) initializing a set of final strong classifiers (FSCs) and a set of candidate strong classifiers (CSCs), the set of FSCs being initialized to null, the set of CSCs being initialized to contain the set of weak learners; (d) applying a selection criterion, selecting the best CSCs from the set of CSCs, generating a next set of CSCs; (e) updating the set of FSCs; (f) if the magnitude of the set of FSCs is equal to L, performing an output module; and (g) using a children function, generating at least one new CSC, adding the at least one new CSC to the next set of CSCs.

According to an exemplary embodiment of the present invention, a method is provided for detection of tumors in 3D CT lung images. The method includes using a learning procedure for feature selection from a feature set based on an annotated image-volume database, generating a set of selected features; building a classifier using a classification scheme to distinguish between a tumor location and a non-tumor location and using the set of selected features; and applying the classifier at a candidate volume to determine whether the candidate volume contains a tumor.

According to an exemplary embodiment of the present invention, a computer readable medium including computer code for 3D object detection is provided. The computer readable medium includes: computer code for using a learning module for feature selection from a feature set based on an annotated image-volume database, generating a set of selected features; computer code for building a classifier using a classification scheme to distinguish between an object location and a non-object location and using the set of selected features; and computer code for applying the classifier at a candidate volume to determine whether the candidate volume contains an object of interest.

According to an exemplary embodiment of the present invention, a computer system for 3D object detection is provided. The computer system includes a processor; and computer program code that executes on the processor. The computer program code includes: computer code for using a learning module for feature selection from a feature set based on an annotated image-volume database, generating a set of selected features; computer code for building a classifier using a classification scheme to distinguish between an object location and a non-object location and using the set of selected features; and computer code for applying the classifier at a candidate volume to determine whether the candidate volume contains an object of interest.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF EXEMPLARY EMBODIMENTS

Hereinafter, the present invention will be described in detail with reference to the accompanying drawings.

Figure 3:
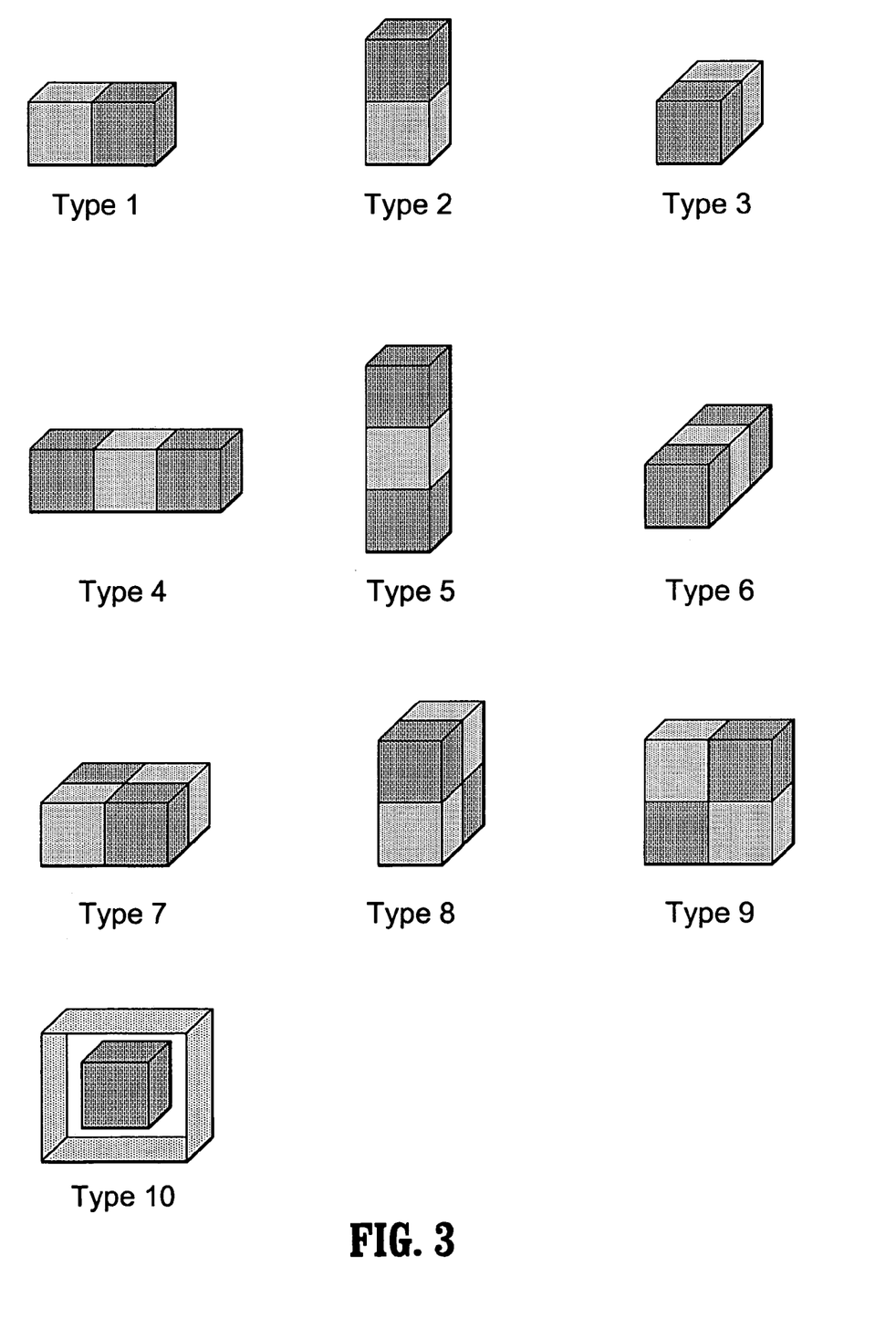
FIG. 3 illustrates ten types of 3D features for tumor detection, according to exemplary embodiments of the present invention.
Figure 4:
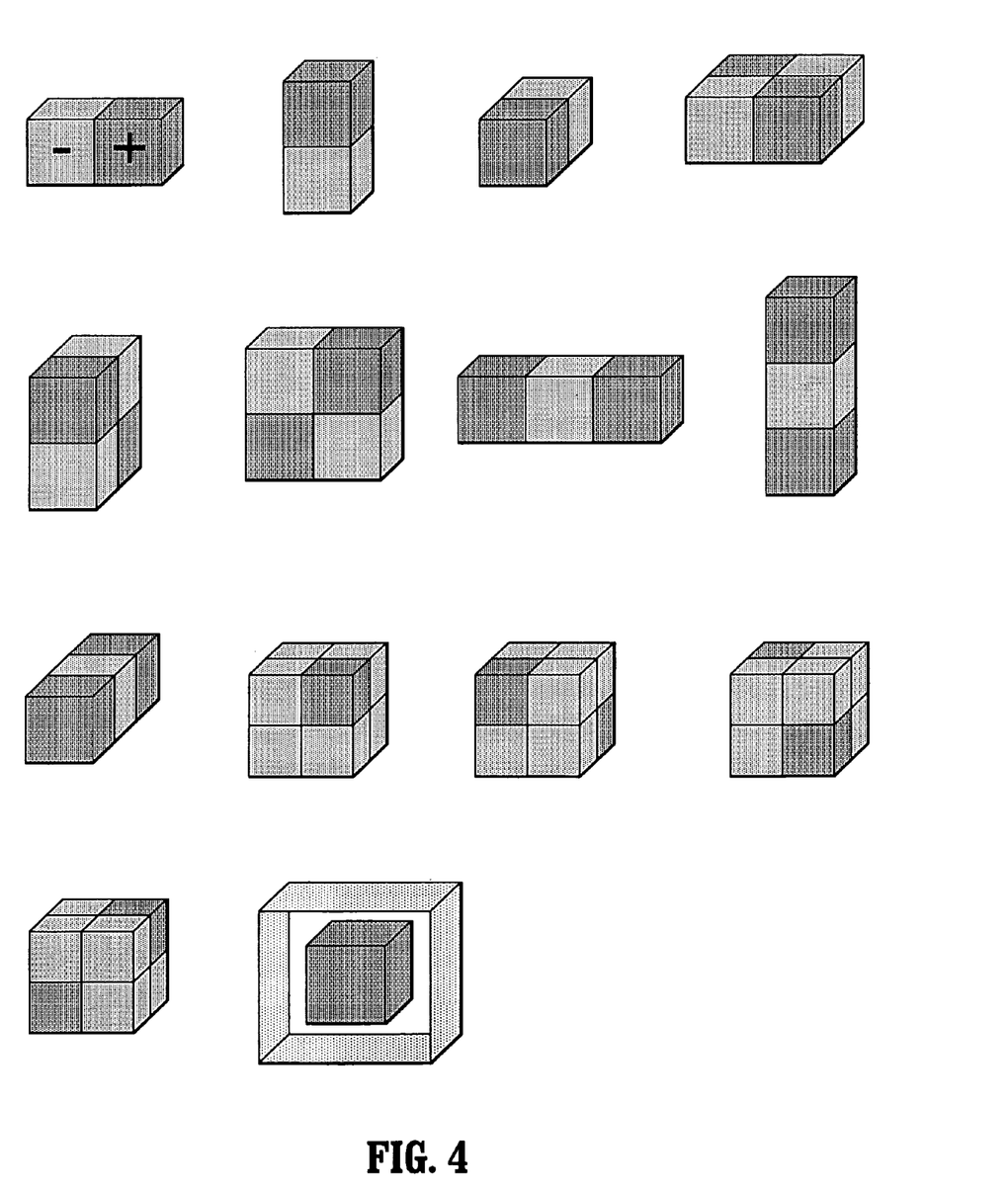
FIG. 4 illustrates types of 3D features for object detection, according to exemplary embodiments of the present invention.
Figure 5:
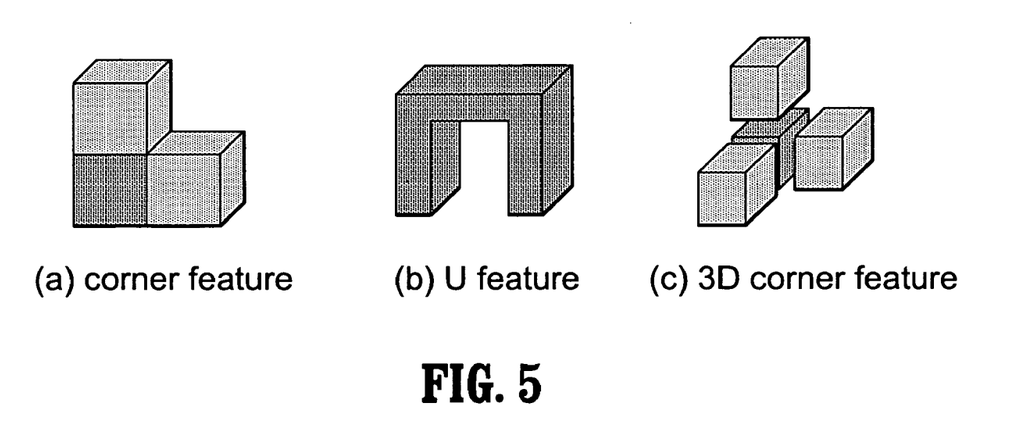
FIG. 5 illustrates three types of 3D features for object detection, according to exemplary embodiments of the present invention.

FIG. 3 illustrates ten types of 3D features for tumor detection, according to exemplary embodiments of the present invention. FIG. 4 illustrates exemplary types of 3D features for object detection, according to exemplary embodiments of the present invention. It should be understood that other types of 3D features can be used to implement the invention. For example, additional types of 3D features for object detection, according to exemplary embodiments of the present invention, are illustrated in FIG. 5. It will be understood that the adoption of different types of 3D features depends on the application and/or system constraints.

Referring to FIG. 3, the ten types of 3D features for tumor detection are used, according to exemplary embodiments of the present invention, for tumor detection in 3D CT lung images. The feature value f for the feature Type 10 shown in FIG. 3 is computed as:

$$f = \frac{S_{inside\ cube}}{n_{inside\ cube}} - \frac{S_{shell\ region}}{n_{shell\ region}}$$

Generally, cancer tumors are rare events in the lungs; therefore, a large amount of negative samples have to be provided to the learning method for training the classifier. According to an embodiment of the present invention, the source of the negative samples is the set of the sub-images containing no tumor in the 3D CT lung image. Hereinafter, a training procedure applying a bootstrap strategy, in accordance with exemplary embodiments of the present invention, will be described.

| Training procedure applying a bootstrap strategy |
|---|
| Input: 3D CT lung images and the ground-truth tumor location in these images; and the maximal number of negative samples for training n |
| Do |
|     1. P = {the set of tumor images}; randomly select a set of non-tumor images $N_i$ |
|     2. i ← 0 |
|     3. Implement learning procedure using P and $N_i$, obtaining strong classifier $SC_i$ |
|     4. i ← i + 1, $N_i$ ← null |
|     5. While $|N_i|$ < n |
|         a) Scan a non-tumor sub-image $I_{neg}$ in the 3D CT lung images, and use $\bigcap_{j=0}^{i} SC_j$ to classify them |
|         b) If $I_{neg}$ is classified as positive, $N_i = N_i \cup I_{neg}$ |
|         c) If $|N_i|$ = n or no more non-tumor sub-image to scan, go to 6 |
|     end while |
|     6. If $|N_i|$ = 0, terminate; otherwise, go to 3 |
| Output: a series of strong classifiers $\{SC_0, SC_1, SC_2, \ldots, \ldots\}$ |

In accordance with exemplary embodiments of the present invention, multiple strong classifiers are derived by using the training procedure applying the bootstrap strategy, as described above.

Figure 2A:
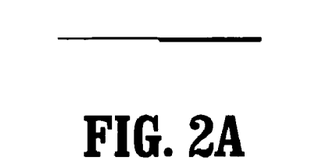
FIG. 2 illustrates sample features for object detection with different computational costs.
Figure 2B:
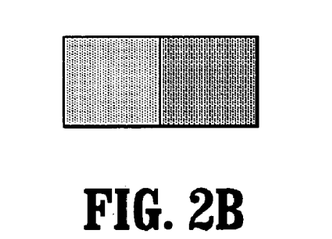
Figure 2C:
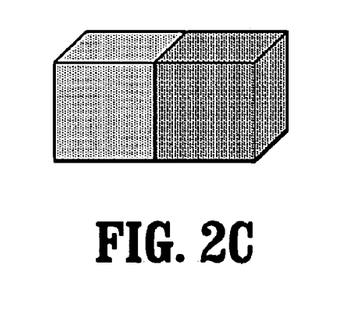
Figure 6:
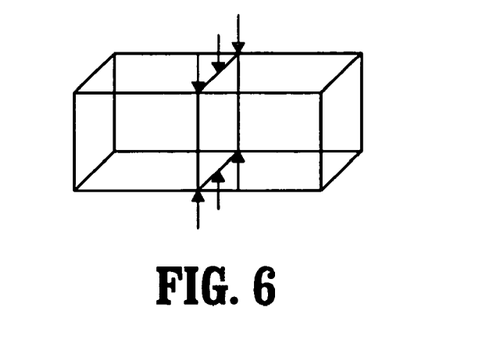
FIG. 6 shows an example of a pre-scanned 2D plane within a 3D volume, according to exemplary embodiments of the present invention.

FIGS. 2A through 2C illustrate sample features for object detection with different computational costs. For the 3D feature illustrated in FIG. 2C, the feature extraction requires 12 array reference accesses. In the 2D case, as shown in FIG. 2B, the feature extraction requires 6 array reference accesses. To reduce computational efforts, according to exemplary embodiments of the present invention, a 3D integral volume is defined that is computed once for each processed volume. According to at least one embodiment of the present invention, intermediate 2D integral planes are also computed inside the 3D volume. It will be understood that the 2D planes can be oriented in either the x-y, x-z, or y-z plane. FIG. 6 shows an example of a pre-scanned 2D plane within a 3D volume, according to exemplary embodiments of the present invention.

According to an embodiment of the present invention, a pruning 2D pre-scan is performed. In the pruning 2D pre-scan, a 2D plane is scanned within a 3D volume prior to the classification using its 3D features. In the pruning 2D pre-scan, according to at least one embodiment of the present invention, fast 2D detectors are applied. Preferably, the fast 2D detectors have a low false-negative rate.

Figure 7A:
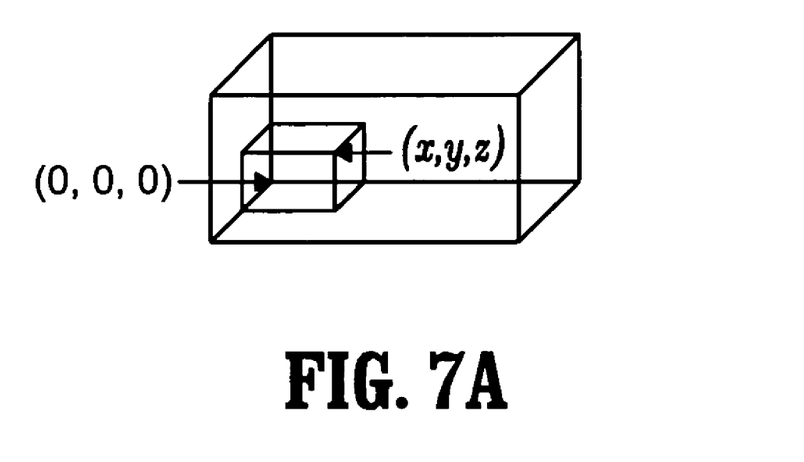
FIG. 7A illustrates a 3D integral image, according to exemplary embodiments of the present invention.
Figure 7B:
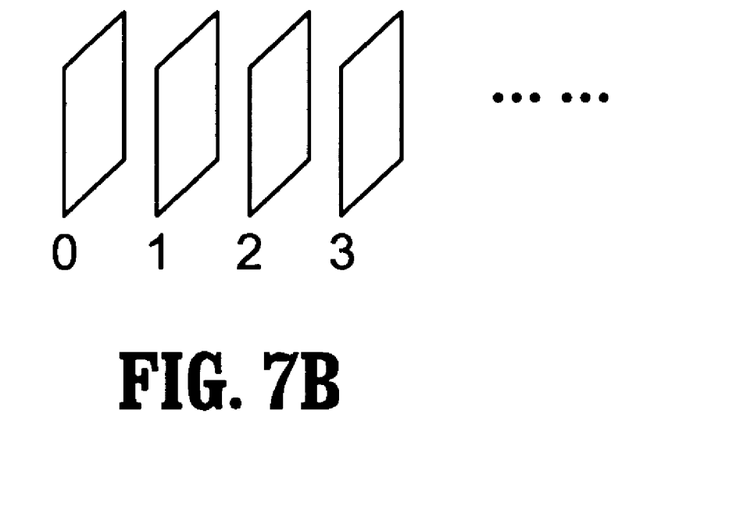
FIG. 7B illustrates an exemplary set of 2D integral images corresponding to the 3D integral image shown in FIG. 7A.

FIG. 7A illustrates a 3D integral image, according to exemplary embodiments of the present invention. Referring to FIG. 7A, the value at (x, y, z) is the summation of all pixels within the small cube. FIG. 7B illustrates an exemplary set of 2D integral images corresponding to the 3D integral image shown in FIG. 7A. The process of computing the 2D integral image and 3D integral volume, according to exemplary embodiments of the present invention, is illustrated in FIGS. 7A and 7B. Its computational complexity is $O(n_1, n_2, n_3)$, where $n_1, n_2, n_3$ are the width, height, and depth of the 3D volume, respectively. The 3D integral image shown in FIG. 7A can be obtained by directly summing up the 2D integral images shown in FIG. 7B. To compute the 2D features, the integral image for each 2D plane is needed. This does not increase the computational load because the 2D integral images, according to at least one embodiment of the present invention, can be obtained during the computation of the 3D integral volume.

To accelerate the detection, in accordance with exemplary embodiments of the present invention, a cascade of classifiers (or a pruning tree) can be constructed. The details concerning one example of a cascade of classifiers is disclosed in co-owned U.S. Provisional Application Ser. No. 60/551,585, filed Mar. 9, 2004 and entitled "Boosted Cascade with Memory," the content of which is hereby incorporated by reference in its entirety.

To provide context for the discussion herein of classifier designs in accordance with embodiments of the present invention, it is noted that the AdaBoost algorithm (Freund and Schapire) searches the weak hypotheses in a greedy mode, i.e., the sample distribution is adaptive to the current weak hypothesis. This is actually a depth-first search strategy. Accordingly, the (AdaBoost algorithm) search is easily diverted from the optimal solution in the iterative boosting procedure Hereinafter, classifier designs, according to exemplary embodiments of the present invention, will be described. In a boosting-based classifier design, according to an embodiment of the present invention, the weak hypothesis is balanced between breath-first and depth-first requirements. To balance the weak hypothesis between breath-first and depth-first requirements, according to an embodiment of the present invention, a tunable tradeoff between explorative and greedy mode is used. At each boosting iteration, a new weak hypothesis with its weight is determined and added into the strong classifier. This process can be conceptualized as building a search route, with a new node (corresponding to the newly-added weak hypothesis) being added to the route at each iteration.

According to an embodiment of the present invention, multiple search routes are built and stored in memory during the boosting process. Due to limitations of computer memory, it is generally impossible to store all the search routes during the search. This computer memory constraint may be denoted by L, the value of which represents the maximal number of classifiers stored in memory.

Hereinafter, a boosting method incorporating feature cost will be described. To guarantee that the boosting search is implemented in the whole weak hypothesis space, and to avoid being stuck into the local minima prematurely, according to exemplary embodiments of the present invention, the selected weak hypotheses are each made different from the others. The difference between two weak hypotheses can be measured by the overlap between the two sample sets which are correctly classified by the two respective weak hypotheses.

A boosting method incorporating feature cost, according to exemplary embodiments of the present invention, is presented below.

---

Boosting method incorporating feature cost

Input:
• The training samples $X = \{(x_1,y_1), \ldots, (x_1,y_1)\}$, which have d features
• The computational costs for the d features $W = \{w_1, w_1, \ldots, w_d\}$
• The maximal number of classifiers allowed to be memorized by system L Initialization: $F \leftarrow$ null
$\psi \leftarrow$ all the d weak learners
$t \leftarrow 0$ while true do
$\quad t \leftarrow t + 1$
$\quad \Phi \leftarrow \text{Select}_{L-|F|}(\psi|W,X)$
$\quad$ for each $\phi_i \in \Phi$ do
$\quad\quad$ if $\text{Criterion}_{\text{terminate}}(\phi_i|X) = \text{true}(\phi_i \in \Phi)$ then
$\quad\quad\quad F \leftarrow F \cup \{\phi_i\}$
$\quad\quad\quad$ Remove $\phi_i$ from $\Phi$
$\quad\quad$ end if
$\quad$ end for
$\quad$ If $|F| = L$, go to Output
$\quad \psi \leftarrow$ null
$\quad$ If $|F| = L$, go to Output
$\quad \psi \leftarrow$ null
$\quad$ for each $\phi_i \in \Phi$ do
$\quad\quad \psi \leftarrow \psi \cup (\phi_i + \text{Children}(\phi_i|t,W,X))$
$\quad$ end for
end while Output: $F_{\text{output}}(x) = \arg\min_{F \in F} \text{Cost}(F|W,X)$

---

Figure 8:
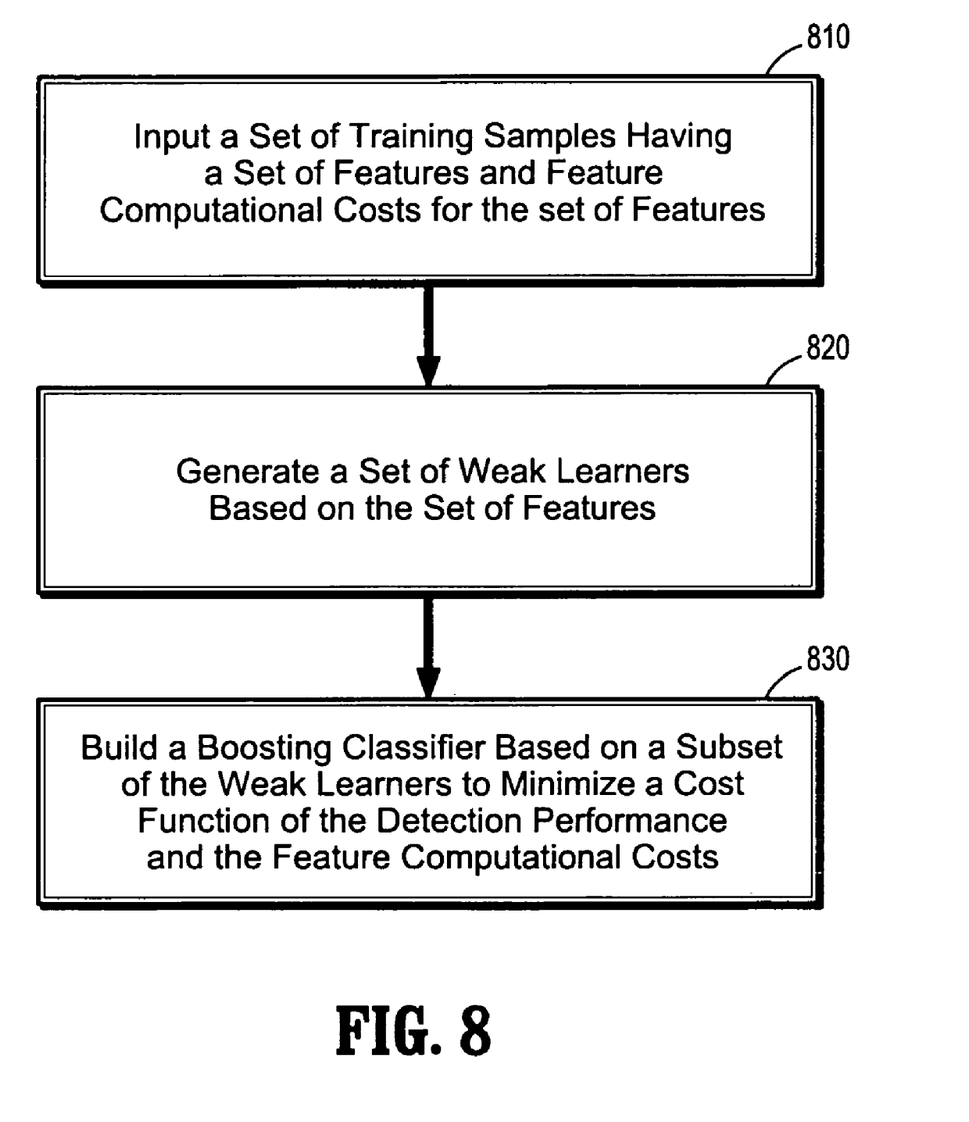
FIG. 8 is a flowchart showing a boosting method incorporating feature cost, in accordance with an exemplary embodiment of the present invention.

FIG. 8 is a flowchart showing a boosting method incorporating feature cost, in accordance with an exemplary embodiment of the present invention. Referring to FIG. 8, in a step 810, inputs include a set of training samples having a set of features, and feature computational costs for the set of features. The feature set may include 3D features, 2D features, 1D features, complex features, and/or combinations thereof.

In a step 820, a set of weak learners is generated based on the set of features. In a step 830, a boosting classifier is built based on a subset of the weak learners to minimize a cost function of the detection performance and the feature computational costs. Detection performance includes, but is not limited to, classification accuracy.

Figure 9:
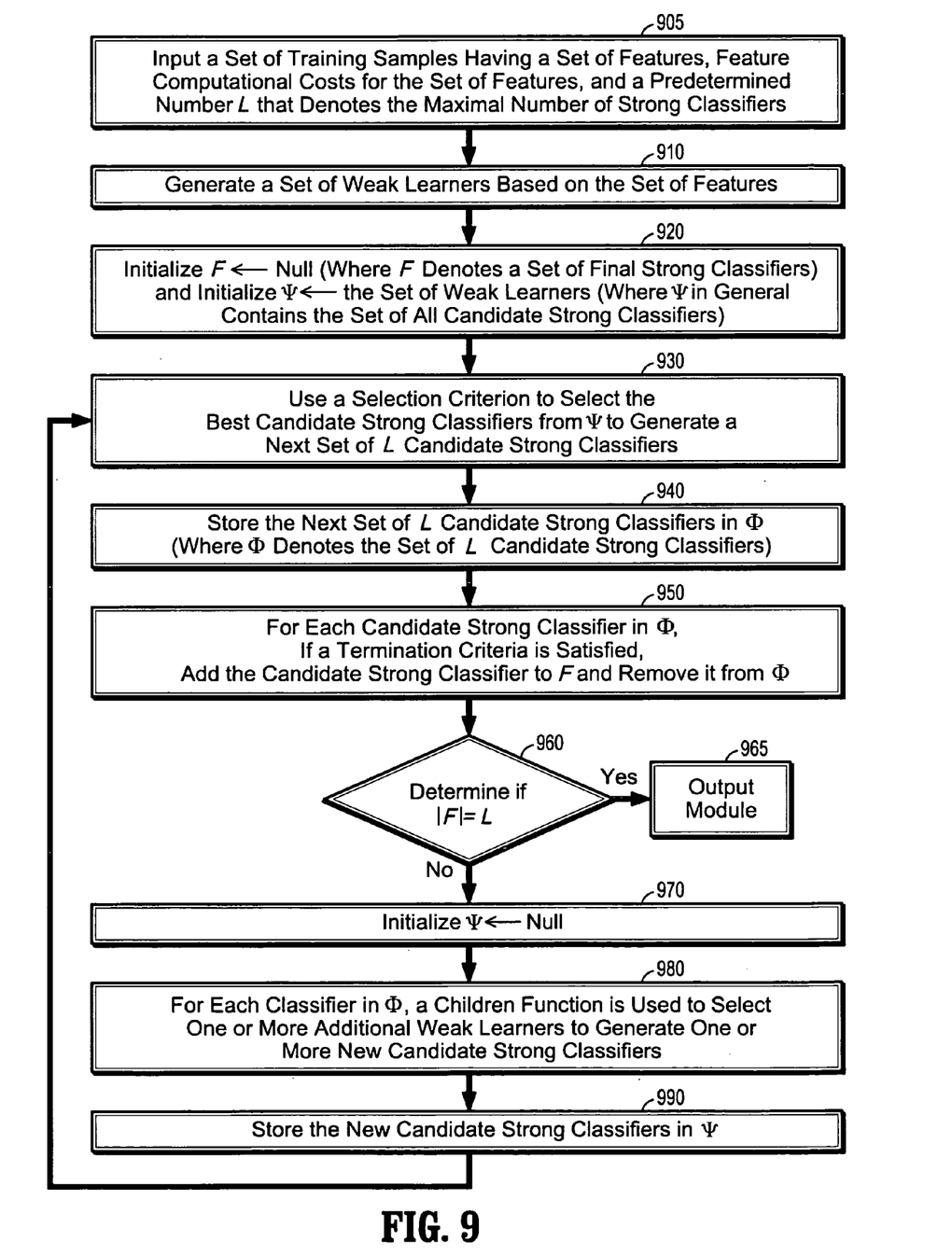
FIG. 9 is a flowchart showing a boosting method incorporating feature cost, in accordance with an exemplary embodiment of the present invention.
Figure 10:
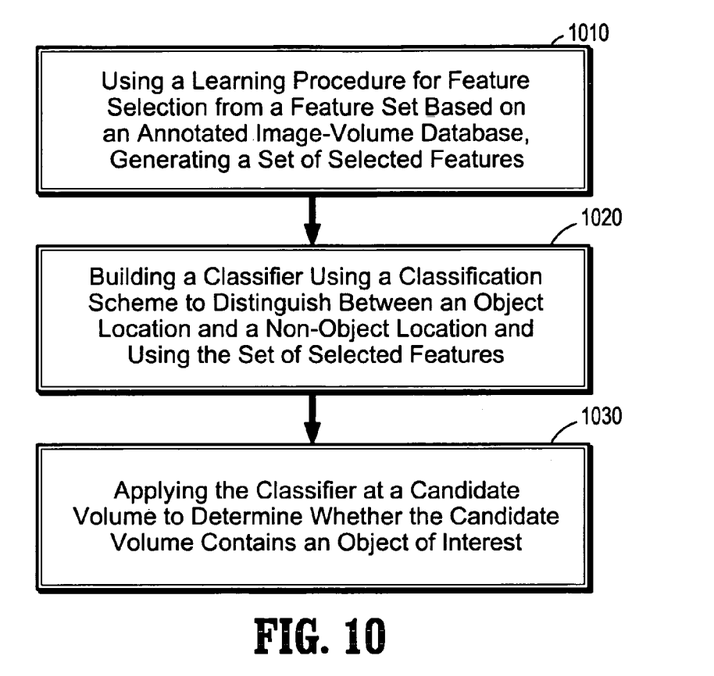
FIG. 10 is a flowchart showing a method of 3D object detection, in accordance with an exemplary embodiment of the present invention.

FIG. 9 is a flowchart showing a boosting method incorporating feature cost, in accordance with an exemplary embodiment of the present invention. FIG. 10 is a flowchart showing a method of 3D object detection, in accordance with an exemplary embodiment of the present invention. Hereinafter, a method of 3D object detection, in accordance with exemplary embodiments of the present invention, will be described with reference to FIGS. 9 and 10.

Referring to FIG. 10, in a step 1010, a learning procedure is used for feature selection from a feature set based on an annotated image-volume database, generating a set of selected features. The feature set may include 3D features, 2D features, 1D features, complex features, and/or combinations thereof.

According to at an exemplary embodiment of the present invention, the step 1010 is performed using a feature selection method. Preferably, the feature selection method is a boosting method. The boosting method, in accordance with exemplary embodiments of the present invention, incorporates feature cost to simultaneously optimize detection performance and cost. Detection performance includes, but is not limited to, classification accuracy. Cost includes, but is not limited to, feature acquisition cost or feature computational cost.

Referring to FIG. 9, in a step 905, the inputs to the boosting method include a set of training samples having a set of features, feature computational costs for the set of features, and a pre-determined number L that denotes the maximal number of strong classifiers.

In a step 910, a set of weak learners is generated based on the set of features. In a step 920, a set of final strong classifiers ("FSCs") is initialized to null, and a set of candidate strong classifiers ("CSCs") is initialized to contain the set of weak learners.

In a step 930, a selection criterion is used to select the best CSCs from the set of CSCs, generating a next set of CSCs. The next set of CSCs is stored in memory, in a step 940. For each CSC in the next set of CSCs, if a termination criterion is not satisfied, the CSC is added to the set of FSCs and removed from the next set of CSCs, in a step 950. Preferably, the termination criterion is based on a validation set and/or a negligible improvement on a class separation margin using a training set.

In a step 960, it is determined if the magnitude of the set of FSCs is equal to L. In the case when the magnitude of the set of FSCs is equal to L, an output module is performed, in a step 965. In the output module, according to exemplary embodiments of the present invention, the best strong classifier is selected from the set of FSCs based on a balancing method. Preferably, the balancing method comprises balancing classification accuracy and feature cost. Feature cost refers to feature acquisition cost and/or feature computational cost.

In the case when the magnitude of the set of FSCs is not equal to L, the next set of CSCs is re-initialized to null, in a step 970. In a step 980, for each the set of CSCs a children function is used to generate one or more new CSC that are added to the next set of CSCs. In an embodiment of the present invention, the children function is used to select one or more weak learners from the next set of CSCs.

Referring now to FIG. 10, in a step 1020, a classifier is built using a classification scheme to distinguish between an object location and a non-object location and using the set of selected features. According to at least one embodiment of the present invention, the step 1020 is performed using a feature selection method. According to at least one embodiment of the present invention, the steps 1010 and 1020 are each performed using a feature selection method.

In a step 1030, the classifier is applied at a candidate volume to determine whether the candidate volume contains an object of interest. In at least one embodiment of the present invention, the candidate volume is obtained by scanning. The candidate volume can be a sub-volume obtained by scanning. In accordance with exemplary embodiments of the present invention, the scanning is performed at a plurality of locations while varying scale, rotation and/or aspect ratio.

Figure 11:
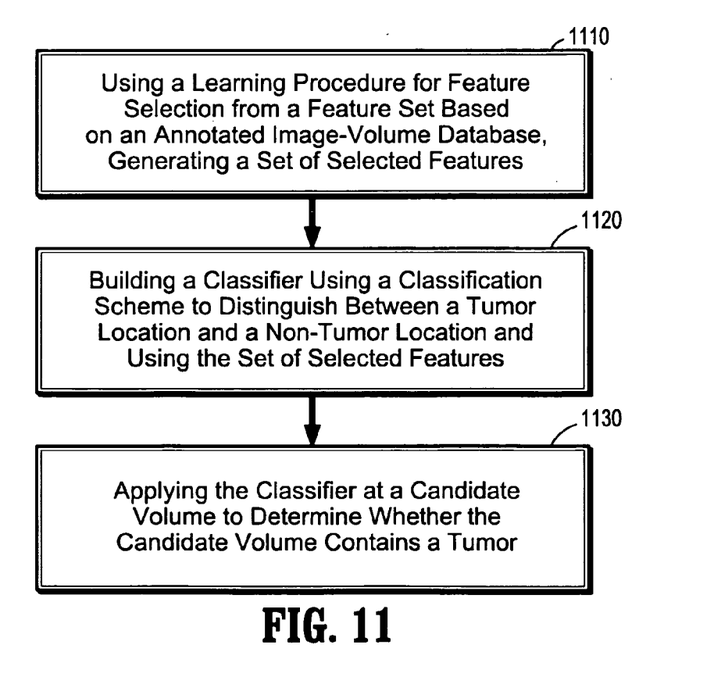
FIG. 11 is a flowchart showing a method of detection of tumors in 3D CT lung images, in accordance with an exemplary embodiment of the present invention.

FIG. 11 is a flowchart showing a method of detection of tumors in 3D CT lung images, in accordance with an exemplary embodiment of the present invention. Referring to FIG. 11, in a step 1110, a learning procedure is used for feature selection from a feature set based on an annotated image-volume database, generating a set of selected features. In exemplary embodiments of the present invention, the feature set comprises 3D features, 2D features, 1D features, complex features, and/or combinations thereof.

According to at least one exemplary embodiment of the present invention, the step 1110 is performed using a feature selection method. Preferably, the feature selection method is a boosting method. The boosting method, in accordance with exemplary embodiments of the present invention, incorporates feature cost to simultaneously optimize detection performance and cost. Detection performance includes, but is not limited to, classification accuracy. Cost includes, but is not limited to, feature acquisition cost or feature computational cost.

Referring to FIG. 9, in a step 905, the inputs to the boosting method include a set of training samples having a set of features, feature computational costs for the set of features, and a pre-determined number L that denotes the maximal number of strong classifiers.

In a step 910, a set of weak learners is generated based on the set of features. In a step 920, a set of FSCs is initialized to null, and a set of CSCs is initialized to contain the set of weak learners.

In a step 930, a selection criterion is used to select the best CSCs from the set of CSCs, generating a next set of CSCs. The next set of CSCs is stored in memory, in a step 940. For each CSC in the next set of CSCs, if a termination criterion is not satisfied, the CSC is added to the set of FSCs and removed from the next set of CSCs, in a step 950. Preferably, the termination criterion is based on a validation set and/or a negligible improvement on a class separation margin using a training set.

In a step 960, it is determined if the magnitude of the set of FSCs is equal to L. In the case when the magnitude of the set of FSCs is equal to L, an output module is performed, in a step 965. In the output module, according to exemplary embodiments of the present invention, the best strong classifier is selected from the set of FSCs based on a balancing method. Preferably, the balancing method comprises balancing classification accuracy and feature cost. Feature cost refers to feature acquisition cost and/or feature computational cost.

In the case when the magnitude of the set of FSCs is not equal to L, the next set of CSCs is re-initialized to null, in a step 970. In a step 980, for each the set of CSCs a children function is used to generate one or more new CSC that are added to the next set of CSCs. In an embodiment of the present invention, the children function is used to select one or more weak learners from the next set of CSCs.

Referring now to FIG. 11, in a step 1120, a classifier is built using a classification scheme to distinguish between a tumor location and a non-tumor location and using the set of selected features. According to at least one exemplary embodiment of the present invention, the step 1120 is performed using a feature selection method. According to at least one exemplary embodiment of the present invention, the steps 1110 and 1120 are each performed using a feature selection method.

In a step 1130, the classifier is applied at a candidate volume to determine whether the candidate volume contains a tumor. In at least one exemplary embodiment of the present invention, the candidate volume is obtained by scanning. The candidate volume can be a sub-volume obtained by scanning. In accordance with exemplary embodiments of the present invention, scanning is performed at a plurality of locations while varying scale, rotation and/or aspect ratio.

Hereinafter, a computer readable medium including computer code for 3D object detection, in accordance with an exemplary embodiment of the present invention will be described. The computer readable medium includes computer code for using a learning module for feature selection from a feature set based on an annotated image-volume database, generating a set of selected features. The computer readable medium includes computer code for building a classifier using a classification scheme to distinguish between an object location and a non-object location and using the set of selected features. The computer readable medium includes computer code for applying the classifier at a candidate volume to determine whether the candidate volume contains an object of interest.

Although the processes and apparatus of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the spirit and scope of the invention as defined by the appended claims.

What is claimed is:

1. A method of detecting tumors in 3D medical images comprising:
   using a learning procedure for feature selection from a feature set based on an annotated medical image-volume database,
   generating a set of selected features;
   building a classifier using a classification scheme to distinguish between tumor location and a non-tumor location and using the set of selected features; and
   applying the classifier at a candidate volume to determine whether the candidate volume contains a tumor.

2. The method of claim 1, wherein the feature set comprises at least one of 3D features, 2D features, 1D features, or complex features.

3. The method of claim 1, wherein at least one of the steps of using a learning procedure for feature selection or building a classifier is performed using a feature selection method.

4. The method of claim 3, wherein the feature selection method is a boosting method.

5. The method of claim 4, wherein the boosting method incorporates feature cost to simultaneously optimize detection performance and cost.

6. The method of claim 5, wherein detection performance comprises classification accuracy, and wherein cost comprises at least one of feature acquisition cost or feature computational cost.

7. The method of claim 4, wherein the boosting method comprises the steps of:
   (a) inputting a set of training samples having a set of features, feature computational costs for the set of features, and a predetermined number L that denotes the maximal number of strong classifiers;
   (b) generating a set of weak learners based on the set of features;
   (c) initializing a set of final strong classifiers (FSCs) and a set of candidate strong classifiers (CSCs), the set of FSCs being initialized to null, the set of CSCs being initialized to contain the set of weak learners;
   (d) applying a selection criterion, selecting the best CSCs from the set of CSCs, generating a next set of CSCs;
   (e) updating the set of FSCs;
   (f) if the magnitude of the set of FSCs is equal to L, performing an output module; and
   (g) using a children function, generating at least one new CSC, wherein the at least one new CSC is added to the next set of CSCs.

8. The method of claim 7, further comprising: (h) repeating steps (d)
   through (g) if the magnitude of the set of FSCs is less than L.

9. The method of claim 7, wherein the updating step comprises:
   determining if a termination criterion is satisfied; and if the termination criterion is not satisfied, for each CSC in the next set of CSCs, adding a CSC to the set of FSCs and removing the CSC from the next set of CSCs.

10. The method of claim 9, wherein the termination criterion is based on at least one of a validation set or a negligible improvement on a class separation margin using a training set.

11. The method of claim 7, wherein the children function is used to select at least one weak learner from the next set of CSCs.

12. The method of claim 7, wherein the step of performing the output module comprises selecting the best strong classifier from the set of FSCs based a balancing method.

13. The method of claim 12, wherein the balancing method comprises balancing classification accuracy and feature cost.

14. The method of claim 1, wherein the candidate volume is obtained by scanning.

15. The method of claim 14 wherein scanning is performed at a plurality of locations, varying at least one of scale, rotation or aspect ratio.

16. A boosting method for training classifiers that distinguish tumor locations from non-tumor location in 3D medical images, wherein said method incorporates feature cost to simultaneously optimize detection performance and cost, said method comprising the steps of:
(a) inputting a set of training samples having a set of features, feature computational costs for the set of features, and a pre-determined number L that denotes the maximal number of strong classifiers;
(b) generating a set of weak learners based on the set of features;
(c) initializing a set of final strong classifiers (FSCs) and a set of candidate strong classifiers (CSCs), the set of FSCs being initialized to null, the set of CSCs being initialized to contain the set of weak learners;
(d) applying a selection criterion, selecting the best CSCs from the set of CSCs, generating a next set of CSCs;
(e) updating the set of FSCs;
(f) if the magnitude of the set of FSCs is equal to L, performing an output module; and
(g) using a children function, generating at least one new CSC, adding the at least one new CSC to the next set of CSCs.

17. The method of claim 16, further comprising: (h) repeating steps (d) through (g) if the magnitude of the set of FSCs is less than L.

18. The method of claim 16, wherein updating the set of FSCs comprises:
determining if a termination criterion is satisfied; and
if the termination criterion is not satisfied, for each CSC in the next set of CSCs, adding a CSC to the set of FSCs and removing the CSC from the next set of CSCs.

19. The method of claim 18, wherein the termination criterion is based on at least one of a validation set or a negligible improvement on a class separation margin using a training set.

20. The method of claim 16, wherein the children function is used to select at least one weak learner from the next set of CSCs.

21. The method of claim 16 wherein the step of performing the output module comprises selecting the best strong classifier from the set of FSCs based a balancing method.

22. The method of claim 21, wherein the balancing method comprises balancing the classification accuracy and feature cost.

23. A program storage device readable by a computer, tangibly embodying a program of instructions executable by the computer to perform the method steps for detecting tumors in 3D medical images, said method comprising the steps of:
using a learning module for feature selection from a feature set based on an annotated medical image-volume database,
generating a set of selected features;
building a classifier using a classification scheme to distinguish between tumor location and a non-tumor location and using the set of selected features; and
applying the classifier at a candidate volume to determine whether the candidate volume contains a tumor.

24. The computer readable program storage device of claim 23, wherein at least one of using a learning module for feature selection or building a classifier includes performing a feature selection method.

25. The computer readable program storage device of claim 23, wherein the feature selection method is a boosting method.

26. The computer readable program storage device of claim 25, wherein the boosting method incorporates feature cost to simultaneously optimize detection performance and cost.

27. The computer readable program storage device of claim 26, wherein detection performance comprises classification accuracy, and wherein cost comprises at least one of feature acquisition cost or feature computational cost.

28. The computer readable program storage device of claim 25, wherein the boosting method comprises the steps of:
(a) inputting a set of training samples having a set of features, feature computational costs for the set of features, and a pre-determined number L that denotes the maximal number of strong classifiers;
(b) generating a set of weak learners based on the set of features;
(c) initializing a set of final strong classifiers (FSCs) and a set of candidate strong classifiers (CSCs), the set of FSCs being initialized to null, the set of CSCs being initialized to contain the set of weak learners;
(d) applying a selection criterion, selecting the best CSCs from the set of CSCs, generating a next set of CSCs;
(e) updating the set of FSCs;
(f) if the magnitude of the set of FSCs is equal to L, performing an output module; and
(g) using a children function, generating at least one new CSC, wherein the at least one new CSC is added to the next set of CSCs.

29. The computer readable program storage device of claim 28, further comprising:
(h) repeating steps (d) through (g) if the magnitude of the set of FSCs is less than L.

30. The computer readable program storage device of claim 28, wherein the updating step comprises:
determining if a termination criterion is satisfied; and
if the termination criterion is not satisfied, for each CSC in the next set of CSCs, adding a CSC to the set of FSCs and removing the CSC from the next set of CSCs.

31. The computer readable program storage device of claim 30, wherein the termination criterion is based on at least one of a validation set or a negligible improvement on a class separation margin using a training set.

32. The computer readable program storage device of claim 28, wherein the children function is used to select at least one weak learner from the next set of CSCs.

33. The computer readable program storage device of claim 28, wherein the step of performing the output module comprises selecting the best strong classifier from the set of FSCs based a balancing method.

34. The computer readable program storage device of claim 33, wherein the balancing method comprises balancing classification accuracy and feature cost.

35. A boosting method for training classifiers that distinguish tumor locations from non-tumor location in 3D medical images, wherein said method incorporates feature cost to simultaneously optimize detection performance and cost, said method comprising the steps of:
(a) inputting a set of training samples having a set of features and feature computational costs for the set of features;
(b) generating a set of weak learners based on the set of features; and
(c) building a boosting classifier based on a subset of the weak learners to minimize a cost function of the detection performance and the feature computational costs.

36. A program storage device readable by a computer, tangibly embodying a program of instructions executable by the computer to perform the method steps for training classifiers that distinguish tumor locations from non-tumor location in 3D medical images, wherein said method incorporates feature cost to simultaneously optimize detection performance and cost, said method comprising the steps of:
(a) inputting a set of training samples having a set of features, feature computational costs for the set of features, and a pre-determined number L that denotes the maximal number of strong classifiers;
(b) generating a set of weak learners based on the set of features;
(c) initializing a set of final strong classifiers (FSCs) and a set of candidate strong classifiers (CSCs), the set of FSCs being initialized to null, the set of CSCs being initialized to contain the set of weak learners;
(d) applying a selection criterion, selecting the best CSCs from the set of CSCs, generating a next set of CSCs;
(e) updating the set of FSCs;
(f) if the magnitude of the set of FSCs is equal to L, performing an output module; and
(g) using a children function, generating at least one new CSC, adding the at least one new CSC to the next set of CSCs.

37. The computer readable program storage device of claim 36, the method further comprising: (h) repeating steps (d) through (g) if the magnitude of the set of FSCs is less than L.

38. The computer readable program storage device of claim 36, wherein updating the set of FSCs comprises:
determining if a termination criterion is satisfied; and
if the termination criterion is not satisfied, for each CSC in the next set of CSCs, adding a CSC to the set of FSCs and removing the CSC from the next set of CSCs.

39. The computer readable program storage device of claim 38, wherein the termination criterion is based on at least one of a validation set or a negligible improvement on a class separation margin using a training set.

* * * * *